July 24, 1934.  A. SCHWEIZER  1,967,631
LIQUID LEVEL GAUGE
Original Filed Dec. 19, 1932  2 Sheets-Sheet 1
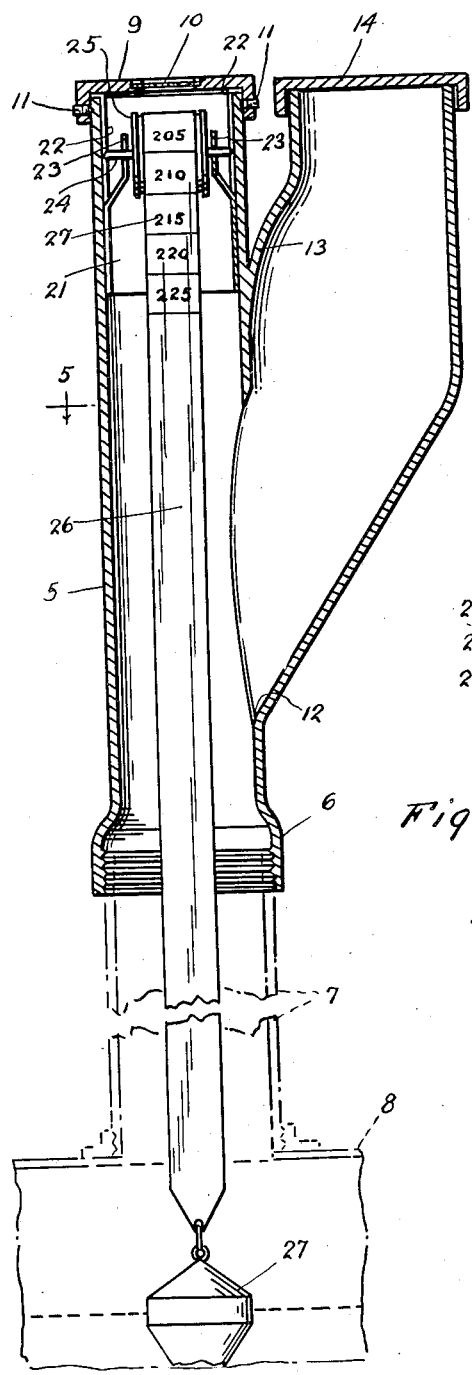
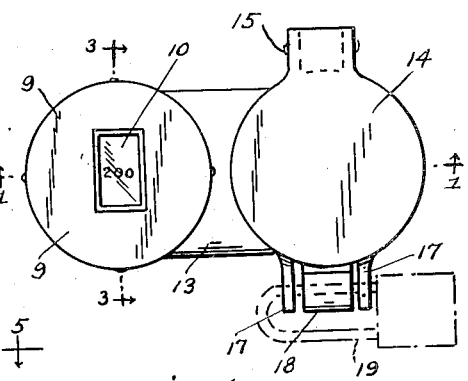
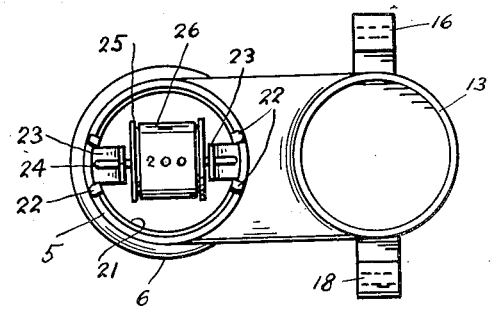
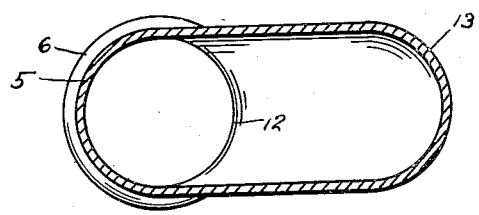
Inventor
Albert Schweizer
By Clarence A. O'Brien
Attorney

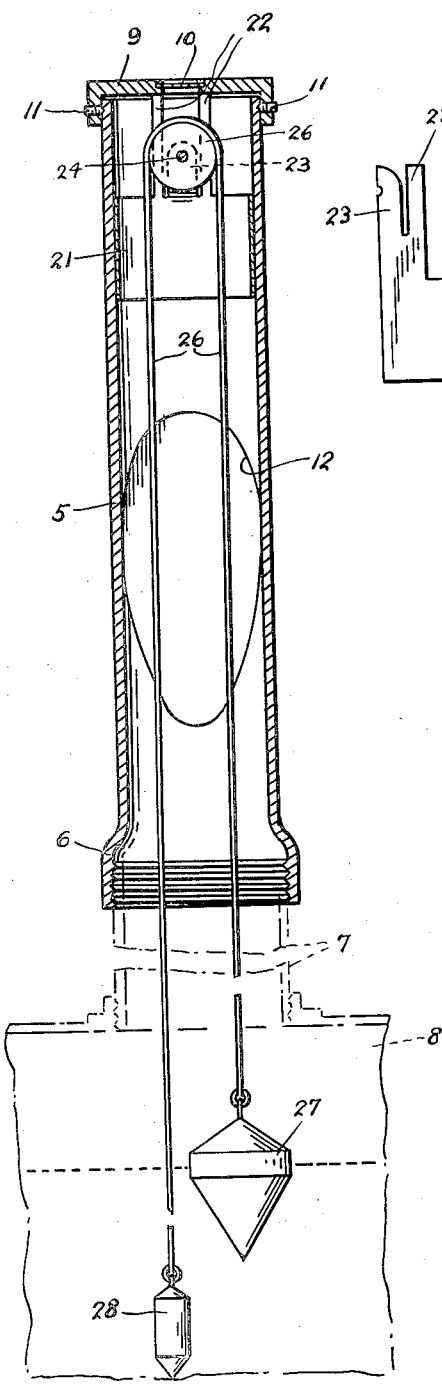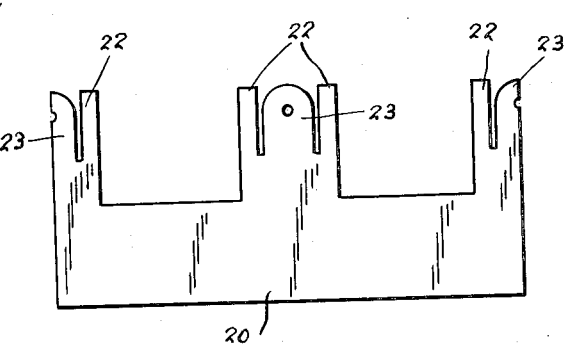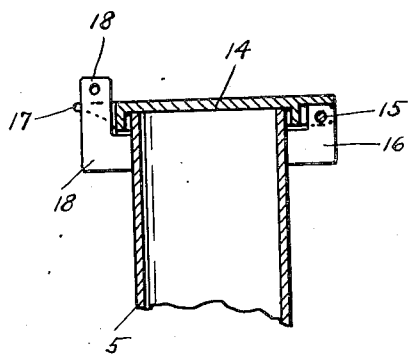

Patented July 24, 1934

1,967,631

UNITED STATES PATENT OFFICE 1,967,631

LIQUID LEVEL GAUGE

Albert Schweizer, Lillian, Ala., assignor to Edna B. Tobin

Application December 19, 1932, Serial No. 648,002
Renewed March 16, 1934

1 Claim. (Cl. 73—82)

This invention relates broadly to liquid level gauges and has particular reference to a gauge for indicating the liquid level in storage tanks for gasoline and the like.

In accordance with the present invention there is provided a gauge of the above mentioned character which may be readily applied to the filling neck of the gasoline storage tank, and which when so applied, will accurately indicate the number of gallons of gasoline in the tank.

Further, in accordance with the present invention the gauge consists of such a construction and arrangement of parts, that, when once applied to the filling neck of the tank it need not be subsequently removed for filling purposes, a filling of the tank being easily and conveniently accomplished without disturbing the position of the gauge.

The invention together with its numerous objects and advantages will be best understood from a study of the following description, taken in connection with the accompanying drawings wherein:

Figure 1 is a longitudinal sectional view taken substantially on line 1—1 of Figure 2 and showing the gauge applied to a tank.

Figure 2 is a top plan view of the gauge.

Figure 3 is a sectional view taken substantially on the line 3—3 of Figure 2.

Figure 4 is a top plan view of the gauge, the covers for the ends of the casing and filling neck being removed.

Figure 5 is a transverse sectional view taken substantially on the line 5—5 of Figure 1.

Figure 6 is a blank from which a pulley support is formed, and

Figure 7 is a fragmentary vertical sectional elevational view showing the manner of hingedly mounting the cap for the filling neck.

Referring to the drawings by reference numerals it will be seen that the gauge comprises a substantially cylindrical casing 5 that is internally threaded as at 6 for screw threaded engagement with the upper end of the filling neck 7 of a conventional gasoline storage tank, a portion of which is shown in broken lines in the drawings and designated by the reference character 8. For the upper end of the casing 5 there is provided a removable cap 9 having in the crown or top thereof a sight window 10. Screws or similar fastening elements 11 are provided for securing the cap 9 in position, the screws as shown being threaded through the flange of the cap and engaged with the wall of the casing 5.

Intermediate its ends the casing 5 is provided with a lateral opening 12 from which extends a branch 13, and as will be made manifest, the branch 13 constitutes a filling neck and has its upper end paralleling the upper end of the casing 5 and is coextensive therewith.

For the upper end of the neck 13 there is provided a flanged cap 14 that is hinged as at 15 to a lug 16 projecting radially from the neck 13. At its free end the cap 14 is provided with a pair of spaced projections 17 between which the upper end of an angular lug 18 provided on the neck 13 extends when the cap 14 is in closed position, or in the position shown in Figure 7. For securing the cap 14 against unauthorized manipulation a padlock or the like 19 may be readily associated with the lug 18 so as to have the lugs 17 engaged therewith, precluding the swinging of the cap 14 upwardly from a closed position. (See Figure 2.)

Arranged within the upper portion of the casing 5 is what may be termed a pulley carrier 20. The pulley carrier 20 as suggested in Figure 6 is formed from a single blank of metal or other suitable material suitably shaped and formed as to provide a substantially cylindrical body 21 adapted to fit snugly within the casing 5 and having at diametrically opposite sides thereof pairs of spring suspension fingers 22 that have their upper ends adapted to be bent over the upper edge of the casing 5 to be clamped between said edge of the casing and the cap 9 in the manner shown in Figure 1 for securing the carrier suspended within the casing. At said opposite sides the body of the carrier is also provided with inwardly directed bearing elements or arms 23 in which are journalled the ends of a shaft 24. Mounted on the shaft 24 is a roller or drum 25, and over the drum 25 is trained a measuring tape 26. Tape 26 may be of any suitable length and material, the tape preferably being of metal and about three quarters of an inch in width. The tape 26 is provided with graduations 27 for indicating gallons; and at one end the tape 26 is provided with a float 27′ and at a relatively opposite end with a weight 28 of lead or other suitable material.

It is thought that the operation of the device is apparent from the above. Obviously as the liquid level in the tank 8 drops a pull will be exerted on the float equipped end of the tape thus causing the graduations 27, to successively appear opposite the window 10 so that one by reading the tape may readily ascertain the number of gallons of gasoline within the tank.

When it is desired to replenish the gasoline, all that is necessary, is to swing the cap 14 to an open position and the gasoline from the source of supply may be readily conducted by a hose to the neck 13 and the gasoline will pass down through the neck and the lower portion of the casing 5 into the storage tank.

It is apparent that with a device of this character the operator of a gasoline station may readily keep an accurate account of the gasoline purchased by him and also the gasoline sold by his attendants.

In actual practice it has been found desirable to install the gauge either with the tape blank and then subsequently mark the tape as fuel is withdrawn from the tank; or with the tank empty, instal the gauge with the tape blank and as each five gallons or any other predetermined amount of fuel is put into the tank, to mark and graduate the tape. The first mentioned method has been found to be the better as there is little or no disturbance of the gas which causes a delay by a wavering of the tape.

Even though I have herein shown and described the preferred embodiment of the invention, it is to be understood that the same is susceptible of further changes, modifications and improvements coming within the scope of the appended claim.

Having thus described my invention, what I claim as new is:

In a tank gauge, a housing, gauging means in said housing comprising a graduated tape with an operating float and counterweight therefor, rotatable means including a pulley in said housing for supporting said tape, means mounting said rotatable means including spaced bearing arms and upstanding fingers, said fingers being adapted to be bent over the top of said housing to support said mounting means, and closure means for said housing adapted to clamp said bent fingers against said housing, said closure means providing a transparent portion for reading the tape.

ALBERT SCHWEIZER.